United States Patent Office 3,052,647
Patented Sept. 4, 1962

3,052,647
HEAT HARDENABLE COMPOSITION COMPRISING AN ALKYD RESIN, AN EPOXY POLYESTER RESIN, AND A DIPENTENE:MALEIC ACID ANHYDRIDE ADDUCT AND PROCESS OF PREPARING SAME
Helmut Pietsch, Geneva, Switzerland, and Rudolf Kohler, Dusseldorf, and Werner Stein, Dusseldorf-Holthausen, Germany, assignors to Henkel & Cie. G.m.b.H., Dusseldorf-Holthausen, Germany, a corporation of Germany
No Drawing. Filed Sept. 5, 1958, Ser. No. 759,139
Claims priority, application Germany Nov. 22, 1957
16 Claims. (Cl. 260—45.4)

This invention relates to a process for the production of hardened casting resins, making use of liquid or meltable condensation products formed by polyvalent alcohols with polybasic acids and epoxy polyester resinous condensate hardeners.

These liquids or meltable condensation products are well-known resinous materials commonly referred to as alkyd resins or "Glyptals," and they have assumed technical importance because it became possible to combine glycerine phthalic acid resins with fatty acids and in this manner to obtain useful and valuable lacquer resins.

The alkyd resins were found to be rather unsuitable for the production of hardened casting resins, however, because of the impossibility of removing the water produced by the condensation reaction continuously. For the production of bubble-free plastic castings, it has therefore been proposed to expose the products during the hardening phase, with the aid of heat, to prolonged periods of pressure. Despite these measures, the resulting products retain a certain degree of thermo-plasticity.

It has also been proposed to add unsaturated dicarboxylic acids, especially maleic acid or its derivatives, to the alkyd resin, whereby vinyl polymerization takes the place of polycondensation during the hardening phase. However, products having a high mechanical strength or temperature stability cannot be obtained in this manner.

It is further known that polyglycidyl ethers can be added to polyester resins in order to obtain elastic alkyd resins. Furthermore, enamels have been produced by a combination of polyglycidyl ethers of polyvalent phenols with either alkyd resins and polyisocyanates or formaldehyde resins and dicyandiamide.

These known resinous products are useful as lacquers or enamels. The hardened resins produced are highly elastic, but they leave much to be desired regarding their mechanical hardness and stability, and are therefore unsuitable for use as casting resins.

We have found that the liquid or still meltable alkyd resin condensation products formed from polyvalent alcohols with polyvalent carboxylic acids can be transformed in very simple fashion and in a relatively short time into mechanically, thermally and electrically stable high-quality hardened products which are bubble-free and non-shrinking by adding to said condensation products an epoxy polycarboxylic acid ester resin in an amount from 30–70%, preferably 40–60%, of the total mixture, and heating the resulting mixture to temperatures between 60 and 350° C. The products are even further improved by the addition of anhydrides of polycarboxylic acids to the mixture of alkyd resin condensation products and epoxy polycarboxylic acid ester resins in an amount from 0–40% of the total mixture. The final composition of the hardenable mixture; if a two component system, is from 30–70%, preferably 40–60%, epoxyalkyl polyester resin and the remainder alkyd resin; or if a three component system, is from 30–70%, preferably 40–60%, epoxyalkyl polyester resin, 15–70%, preferably 20–40% alkyd resin and 0–40% preferably 15–35% polycarboxylic acid anhydride.

The selection of the suitable alkyd resin condensation product, which has been produced in accordance with known methods, depends upon the requirements of the particular intended field of use and the desired properties. The alcohol component can consist of saturated and unsaturated aliphatic polyhydric alcohols, such as glycols, glycol ethers, glycerol, pentaerythrite and hexites as well as polyhydric ethanolamines. If dihydric alcohols are used, they are used in mixture with tri- or higher polyhydric alcohols. The alcohol mixture used for the production of the condensation products should consist partially or entirely of trihydric or higher-polyhydric alcohols. The condensation products of these tri-hydric or higher-polyhydric alcohols and polycarboxylic acids, which are commonly referred to in literature as "Glyptal" resins, contain unreacted secondary hydroxyl groups and are particularly well suited as starting materials within the scope of the present invention, probably because the hardening takes place due to a reaction of the secondary hydroxyl groups of the resin molecule with the epoxy groups of the epoxy polyester resin.

The acid components of the alkyd resin condensation products may be saturated or unsaturated aliphatic or aromatic di- and polycarboxylic acids and their anhydrides. Examples of such acids are oxalic acid, succinic acid, maleic acid, the adduct formed by anthracene and maleic acid and the various phthalic acids such as ortho-phthalic acid, iso- or meta-phthalic acid, para- or terephthalic acid and their tetrachloro and tetrahydro derivatives, endomethylene tetrahydrophthalic acid and endomethylene hexachlorophthalic acid. Similarly, dicarboxylic acids containing hydroxyl groups, such as tartaric acid, citric acid, hydroxy-isophthalic acid, or other benzene hydroxydicarboxylic acids and naphthalene hydroxydicarboxylic acids may be used for the production of the condensation products. The preferable acid components of the alkyd resin condensation products are the various phthalic acids and their anhydrides either alone or admixed with other polycarboxylic acids. The known resins may also be modified by condensing with monovalent alcohols and saturated or unsaturated mono-carboxylic acids.

The epoxy polycarboxylic acid ester resins which are added according to the present invention are mixtures of compounds essentially within the structural formula:

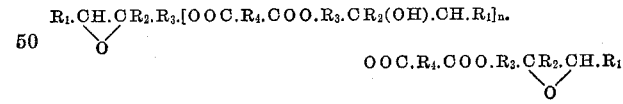

wherein $R_1$ and $R_2$ are radicals selected from the group consisting of hydrogen, alkyl and aryl or monovalent aromatic hydrocarbon radicals, $R_3$ and $R_4$ are bivalent radicals selected from the group consisting of alkylene and arylene or divalent aromatic hydrocarbon radicals, and $n$ is an integer from 0 to 10.

These epoxyalkyl polyester resins are produced, for example in accordance with the process described in German Patent No. 944,995 by reacting a stoichiometric mixture of an alkali metal salt of a dicarboxylic acid and a halogen epoxide in paste-like form in the presence of diluents under mechanical agitation and in the presence of a catalyst at elevated temperature and, if desired, under pressure.

The above-mentioned epoxy polyester resins in admixture with the liquid or meltable alkyl resin condensation products containing unreacted secondary hydroxyl groups are hardened under elevated temperatures and optionally in the presence of anhydrides of polycarboxylic acids. Particularly suitable are the anhydrides of the same acids which form the basis of either the alkyd resin condensation product or of the epoxy polyester resin. The chemical reactions which occur during this hardening phase are not clearly understood. It is suspected that the acid anhydrides react, on the one hand, with the reactive groups of the alkyd resin, for example with the hydroxyl or amino groups, if present, and, on the other hand, with those of the epoxy polyester, and that the free hydroxyl groups of the alkyd resin partially and simultaneously react with the epoxy groups of the epoxy polyester.

However, it is also possible that hardening takes place due to a cross-linking esterification as can be observed in the case of the alkyd resins formed from pentaerythrite and hexite. These resins harden in admixture with an epoxy polyester resin by mere heating of the mixture and without the addition of an acid anhydride.

The hardening of the mixtures according to the present invention takes place at temperatures of 60 to 350° C., but in general it is sufficient to heat the mixture at temperatures between 100 and 200° C. for a few hours. The heating period and the required temperature are individually dependent upon the composition of the condensation product as well as upon the composition of the hardener used, and may be readily determined within the aforesaid limits by those skilled in the art by preliminary experiments.

The resins obtained by the process according to the present invention exhibit a great mechanical hardness and strength at normal temperatures, and exhibit a form-retention capability according to Martens of 80–140° C. Thus, the process according to the present invention makes it possible for the first time to transform the brittle and technically relatively valueless "Glyptal" resins in simple fashion into high-quality synthetic resins which are excellently suitable for use as casting and impregnating resins and as coatings for electro-technical purposes and in the machine and apparatus construction field.

The properties of these resins can be further improved if, according to a preferred embodiment of the present invention, addition adducts formed by maleic acid anhydride and dipentene are used as the anhydride component to assist in the hardening. The use of such anhydride addition adducts causes a reduction in the viscosity of the unhardened resinous mixture and increases the crucible period considerably without adversely influencing the Martens strength or the impact resistance of the end product. The resinous mixtures produced containing these anhydride addition products are capable of penetrating the smallest hollow spaces and crevices because of their low viscosity and long crucible period. Moreover, they can be handled in a vacuum without bubble formation. For this reason, they are particularly well suited, for example, for impregnating coils and condensers.

Dipentene is capable of combining with up to 2 mols maleic acid anhydride. Solid resins which are hard at room temperature are formed thereby. These adducts may be admixed with the previously described alkyd and epoxy resin mixture while hot. The production of addition compounds formed by maleic acid anhydride and dipentene is known as such. It is accomplished by heating the components to 160–180° C., using an excess of dipentene, if desired. The reaction mixture can be separated by vacuum distillation, whereby unreacted components are first removed and various fractions are then separated. At a vacuum of 1–2 mm. mercury at 145–160° C. a product composed of the adduct of 1 mol dipentene and 1 mol maleic acid anhydride passes over, at a higher temperature the adduct of 1 mol dipentene and 2 mols maleic acid anhydride. A hard, resilient resin remains behind as the residue. The distilled products are preferably employed for the process according to the present invention. The first-mentioned reaction product formed by the adduct of 1 mol of maleic acid anhydride and 1 mol dipentene produces the greatest reduction in viscosity and prolongation of the crucible period. Similarly, the addition product formed by the adduct of 2 mols maleic acid anhydride and 1 mol dipentene, or mixtures of the two above-mentioned addition products, are highly effective. Thus, for example, a mixture produced in accordance with Example 7 below from alkyd resin, epoxy resin and anhydride hardener has a viscosity of about 1000 cp. at 100–110° C. and a pourability of up to one hour. If, instead of a mixture of phthalic acid and tetrahydrophthalic acid anhydrides as anhydride hardeners, the same amount of the addition product formed by the adduct of 1 mol maleic acid anhydride and 1 mol of dipentene is added to the mixture as an anhydride hardener, the viscosity decreases to 100–300 cp. at the same temperature and the mixture has a pourability up to 12 hours.

The following examples will further illustrate the present invention and enable others skilled in the art to understand it more completely. It will be understood, however, that the invention is not limited to these particular examples.

*Example I*

296 gm. of phthalic acid anhydride and 148 gm. of glycerine are first heated to 120° C. until a clear solution is formed, and are then slowly heated for a period of 2–3 hours at 180° C. and finally for an additional hour at 210° C., a vacuum of 1–2 mm. mercury is then applied to the mixture for 50 minutes. The slightly yellow, clear resin has an acid number of 50; a hydroxyl number of 230; a saponification number of 525; and an average molecular weight (dioxane) of 410.

35 gm. of this resin, 35 gm. of phthalic acid anhydride and 100 gm. of an epoxy polyester resin produced from sodium orthophthalate and epichlorohydrin, in accordance with Example 3 of German Patent No. 944,995, upon being hardened for 10 hours at 140° C. produce a solid resin having a temperature stability of 90–95° C. and an impact resistance of 15–20 cm. kg./cm.$^2$.

*Example II*

An alkyd resin is produced by condensing 98 g. of maleic acid anhydride, 146 gm. of phthalic acid anhydride, 92 g. of glycerine and 62 gm. of ethylene glycol. These materials are mixed and heated in a round-bottom flask on a liquid bath to 170–180° C. until the acid number drops to below 100. Thereafter, while increasing the temperature to 200–210° C., a vacuum of 1–3 mercury is applied to the mixture for 40–60 minutes. A solid, weakly yellow resin is formed. 70 gm. of this resin, 30 gm. of maleic acid anhydride and 100 gm. of an epoxy polyester resin as in Example I are admixed with each other, the mixture is fused at 80–100° C. and is poured into molds in which the resin is allowed to remain for 14 hours at 180° C. for purposes of hardening. The Martens strength according to Deutsche Industrienormen specification number 53,458 amounts to 105–110° C. and the impact resistance according to Deutsche Industrienormen specification number 53,453 is 5–10 cm. kg./cm.$^2$. The Deutsche Industrienormen are the German industrial standards corresponding to ASTM standards.

*Example III*

207 gm. of phthalic acid anhydride and 93 gm. of pentaerythrite are heated for 2 hours at 140° C., and the hot mixture is subsequently degassed for 15 minutes under a vacuum of 5 mm. mercury. 50 gm. of this resin and 50 gm. of an epoxy polyester resin as in Example I are mixed and hardened for 14 hours at 150° C. The resulting resin has a Martens strength of 80–85° C. and an impact resistance of 4–6 cm. kg./cm.$^2$.

Example IV 100 gm. of terephthalic acid and 180 gm. of glycerine are heated for 2 hours at 240–250° C. Subsequently, the glycerine is distilled off under a vacuum of 1 mm. mercury. 50 gm. of the brownish transparent resin formed were admixed with 30 gm. of phthalic acid anhydride and 100 gm. of an epoxy polyester resin as in Example I and the mixture was hardened at 180° C. for 3 hours. Martens temperatures of 75–80° C. and impact resistances of 18–22 cm. kg./cm.² were determined for the product.

Example V 250 gm. of isophthalic acid and 460 gm. of glycerine are heated to 230° C. over a course of one hour while stirring and approximately 50 gm. of water distilled off. Thereafter, 280 gm. of glycerine were distilled off at 0.5–1 mm. mercury. 300 gm. of a solid resin having an acid number of 2 are obtained. 50 gm. of this resin, 60 gm. of tetrahydrophthalic acid anhydride and 100 gm. of an epoxy polyester resin as in Example I after being hardened for 3 hours at 180° C., produce a hardened resin having a Martens strength around 80° C. and an impact resistance of 15–20 cm. kg./cm.².

Example VI

If, in place of the 60 gm. of tetrahydrophthalic acid anhydride in Example V, 70 gm. of a mixture of equal parts by weight of phthalic acid anhydride and tetrahydrophthalic acid anhydride are used, a hardened resin having a Martens stability around 85–90° C. and the same impact strength are obtained. As a whole, these values remain the same when 80 gm. of a mixture of tetrahydrophthalic acid anhydride and phthalic acid anhydride (1:2) are used as hardeners.

Example VII 286 gm. of tetrachlorophthalic acid anhydride and 368 gm. of glycerine were heated to 230° C. and allowed to remain for 2 hours at that temperature. About 20 gm. of water distilled off. Subsequently, the glycerine was completely distilled off in a vacuum of a few mm. mercury. A dark, transparent resin, having an acid number of 1,3, a molecular weight of 900–1100, and a thermometer drip point according to G. F. D'Alelio ("Kunststoffpraktikum," page 181, published by Karl-Hanser-Verlag, Munich, 1952), of more than 140° C., remained behind. 70 gm. of this resin, 80 gm. of a mixture of the anhydrides of phthalic acid and tetrahydrophthalic acid (2:1), and 100 gm. of an epoxy polyester resin as in Example I were melted together, degassed in a vacuum accompanied by stirring and then hardened in molds for 12 hours at 180° C. The hardened resin formed thereby has a temperature resistance of 95–105° C. and an impact strength of 15–20 cm. kg./cm.². The same result was obtained when 80 gm. of the above tetrachlorophthalic acid "Glyptal" were used instead of 70 gm.

Example VIII 286 gm. of tetrachlorophthalic acid anhydride, 384 gm. of maleic acid anhydride and 552 gm. of glycerine were heated within a period of 1 hour to 200° C. and the mixture was allowed to stand at that temperature for 2 hours. A vacuum of 0.5 mm. mercury was applied until no more glycerine could be distilled off. A residue of a light-yellow, transparent resin was obtained. 80 gm. of this light-yellow, transparent resin, 70 gm. of a mixture of the anhydrides of phthalic acid and tetrahydrophthalic acid (2:1) and 100 gm. of an epoxy polyester resin as in Example I were melted together at 80° C., degassed and hardened for 14 hours at 140° C. The hardened resin had a temperature resistance according to Martens of around 80–90° C. and an impact strength of 30–35 cm. kg./cm.².

Example IX 8 parts by weight of the "Glyptal" resin described in Example VII, formed from glycerine and tetrachlorophthalic acid anhydride, were melted together at 80–100° C., accompanied by stirring, with 10 parts by weight of an epoxide resin produced from sodium orthophthalate and epichlorohydrin in accordance with Example 3 of German Patent No. 944,995 and 7 parts of an adduct of 1 mol of maleic acid anhydride and 1 mol of dipentene, which had been purified by distillation. The mixture was completely degassed in a vacuum of 5–10 mm. mercury. The viscosity of this mixture was 200 cp. at 100° C. The mixture was still pourable after about 10 hours. After a hardening treatment of 8–10 hours at 180° C., the hardened resin exhibited a temperature stability according to Martens of 110–120° C. and an impact resistance of 15–20 cm. kg./cm.².

While we have disclosed various specific embodiments of our invention, it will be apparent to persons skilled in the art that the present invention is not limited to these specific embodiments and that various changes and modifications may be made without departing from the spirit of the invention or the scope of the appended claims.

We claim:

1. A process of hardening alkyd resins wherein the alcohol component is entirely derived from alcohols having at least three hydroxy groups which comprises adding to said resins (1) an epoxy polyester resin having essentially the structural formula

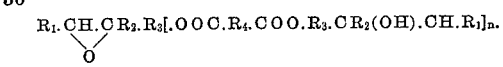

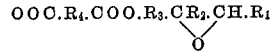

wherein $R_1$ and $R_2$ are selected from the group consisting of hydrogen, alkyl and aryl radicals, $R_3$ and $R_4$ are bivalent radicals selected from the group consisting of alkylene and arylene radicals and $n$ is an integer from 0 to 10 and (2) a dipentene:maleic acid anhydride adduct hardener, said three components being the sole reactants, and heating the resulting mixture to temperatures of 60° to 350° C. for a time sufficient to effect hardening.

2. The process of claim 1 wherein said epoxy polyester resin is present in amounts of from 40% to 60% by weight of the hardenable mixture.

3. The process of claim 1 wherein said epoxy polyester resin is present in amounts of from 40% to 60% and said anhydride adduct hardener is present in amounts of from 15% to 35% by weight of the hardenable mixture.

4. The process of hardening polyester resin condensation products formed from glycerine and a phthalic acid which comprises adding to said condensation products (1) an epoxy polyester resin having two glycide moieties and at least one phthalic acid moiety and (2) at dipentene:maleic acid anhydride adduct hardener, said three components being the sole reactants, and heating the resulting mixture to temperatures of 100° to 200° C. for a time sufficient to effect hardening.

5. The process of producing hardened resins which comprises admixing from 20% to 40% by weight of the mixture of a polyester resin condensation product formed from glycerine and a phthalic acid, from 40% to 60% by weight of the mixture of an epoxy polyester resin having two glycide moieties and at least one phthalic acid moiety and from 15% to 35% by weight of the mixture of a dipentene:maleic acid anhydride adduct hardener, said three components being the sole reactants, and heating the resulting mixture to temperatures of 100° to 200° C. for a few hours.

6. The process of claim 5 wherein said adduct hardener is the distillation product of the condensation of dipentene and maleic acid anhydride.

7. The process of claim 6 wherein said distillation product is the adduct of 1 mol of dipentene with 1 mol of maleic acid anhydride.

8. The process of producing hardened resins which comprises admixing from 20% to 40% by weight of the mixture of a polyester resin condensation product formed from glycerine and tetrachlorophthalic acid, said resin having a thermometer drip point of more than 140° C., an average molecular weight of about 1000 and an acid number of less than 20, 40% to 60% by weight of the mixture of an epoxy polyester having two glycide moieties and at least one phthalic acid moiety and from 15% to 35% by weight of the mixture of the 1 to 1 adduct of dipentene and maleic acid anhydride, said three components being the sole reactants, and heating the resulting mixture to temperatures of 100° to 200° C. for a few hours.

9. A heat hardenable resinous composition comprising (1) an alkyd resin wherein the alcohol component is entirely derived from alcohols having at least three hydroxy groups, (2) an epoxy polyester resin having essentially the structural formula

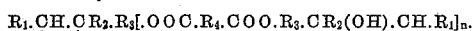
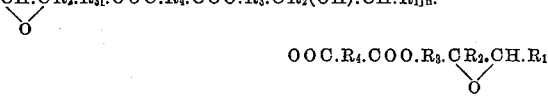

wherein $R_1$ and $R_2$ are radicals selected from the group consisting of hydrogen, alkyl and aryl radicals, $R_3$ and $R_4$ are bivalent radicals selected from the group consisting of alkylene and arylene radicals and $n$ is an integer from 0 to 10, and (3) a dipentene:maleic acid anhydride adduct hardener, said three components being the sole reactants.

10. The composition of claim 9 wherein said epoxy polyester resin is present in amounts of from 40% to 60% by weight of the hardenable mixture.

11. The composition of claim 9 wherein said epoxy polyester resin is present in amounts of from 40% to 60% and said anhydride adduct hardener is present in amounts of from 15% to 35% by weight of the hardenable mixture.

12. A heat hardenable resinous composition comprising (1) a polyester resin condensation product formed from glycerine and a phthalic acid, (2) an epoxy polyester resin having two glycide moieties and at least one phthalic acid moiety and (3) a dipentene:maleic acid anhydride adduct hardener, said three components being the sole reactants.

13. A heat hardenable resinous composition comprising from 20% to 40% by weight of the mixture of a polyester resin condensation product formed from glycerine and a phthalic acid, from 40% to 60% by weight of the mixture of an epoxy polyester resin having two glycide moieties and at least one phthalic acid moiety and from 15% to 35% by weight of the mixture of a dipentene:maleic acid anhydride adduct hardener, said three components being the sole reactants.

14. The composition of claim 13 wherein said adduct hardener is the distillation product of the condensation having a ratio of 1 mol of dipentene to 1 mol of maleic acid anhydride.

15. A heat hardenable resinous composition comprising from 20% to 40% by weight of the mixture of a polyester resin condensation product formed from glycerine and tetrachlorophthalic acid, said resin having a thermometer drip point of more than 140° C., an average molecular weight of about 1000 and an acid number of less than 20, 40% to 60% by weight of the mixture of an epoxy polyester having two glycide moieties and at least one phthalic acid moiety and from 15% to 35% by weight of the mixture of the 1 to 1 adduct of dipentene and maleic acid anhydride, said three components being the sole reactants.

16. The hardened resin produced by the process of claim 1.

References Cited in the file of this patent

UNITED STATES PATENTS

| | | |
|---|---|---|
| 2,591,539 | Greenlee | Apr. 1, 1952 |
| 2,691,004 | Doyle | Oct. 5, 1954 |
| 2,712,535 | Fisch | July 5, 1955 |
| 2,781,333 | Updegraff | Feb. 12, 1957 |
| 2,887,459 | Carmody | May 19, 1959 |
| 2,908,660 | Belanger | Oct. 13, 1959 |

FOREIGN PATENTS

| | | |
|---|---|---|
| 944,995 | Germany | June 28, 1956 |